US008313790B2

(12) United States Patent
Deleuze et al.

(10) Patent No.: US 8,313,790 B2
(45) Date of Patent: Nov. 20, 2012

(54) EXTRACTING CARBONYL COMPOUNDS FROM A DRINK BY EXTRACTION WITH A FUNCTIONALIZED INERT SUPPORT

(75) Inventors: Hervé Deleuze, Saint-Hagne (FR);
Mélanie Blasi, Villenave d'Ornon (FR);
Jean-Christophe Barbe, Portets (FR);
Denis Dubourdieu, Beguey (FR);
Bernard Jean Maillard, Pessac (FR)

(73) Assignee: Centre National de la Recherche Scientifique (CNRS), Paris (FR)

( * ) Notice: Subject to any disclaimer, the term of this patent is extended or adjusted under 35 U.S.C. 154(b) by 887 days.

(21) Appl. No.: 12/293,802

(22) PCT Filed: Mar. 22, 2007

(86) PCT No.: PCT/EP2007/052737
§ 371 (c)(1),
(2), (4) Date: Oct. 1, 2008

(87) PCT Pub. No.: WO2007/107603
PCT Pub. Date: Sep. 27, 2007

(65) Prior Publication Data
US 2010/0166930 A1    Jul. 1, 2010

(30) Foreign Application Priority Data
Mar. 22, 2006   (FR) ...................................... 06 02486

(51) Int. Cl.
*A23L 2/02* (2006.01)
(52) U.S. Cl. .......... 426/590; 426/422; 426/599; 426/592
(58) Field of Classification Search .................. 426/490, 426/422, 590, 599, 592
See application file for complete search history.

(56) References Cited

U.S. PATENT DOCUMENTS

| | | | | |
|---|---|---|---|---|
| 3,052,547 | A | * | 9/1962 | Haas et al. ........................ 426/12 |
| 3,878,310 | A | * | 4/1975 | Field et al. ..................... 426/422 |
| 5,856,429 | A | * | 1/1999 | Michos .......................... 528/332 |
| 6,001,406 | A | * | 12/1999 | Katzke et al. .................. 426/422 |
| 2004/0161366 | A1 | * | 8/2004 | Miller .............................. 422/58 |
| 2005/0100959 | A1 | * | 5/2005 | Sinbanda et al. ............... 435/7.1 |
| 2009/0214701 | A1 | * | 8/2009 | Forchhammer et al. ......... 426/11 |

FOREIGN PATENT DOCUMENTS

| | | |
|---|---|---|
| DE | 197 24 488 C1 | 6/1998 |
| EP | 0 025 163 A | 3/1981 |
| FR | 2 851 250 A1 | 8/2004 |
| FR | 2851250 * | 8/2004 |

OTHER PUBLICATIONS

Cullere et al. Analysis for Wine C5-C8 Aldehydes. Analytica Chimica Acta 524 (2004) pp. 201-206.*
English Translation for FR 2851250 published Aug. 2004.*
NW Winemaking Notes. Reduced Sulfur Problems in Wine (small title at top of page) 2004. http://www.nanaimowinemakers.org/Steps/H2S_Issues.htm.*

* cited by examiner

*Primary Examiner* — Anthony Weier
(74) *Attorney, Agent, or Firm* — Foley & Lardner LLP

(57) ABSTRACT

The present invention relates to a process for extracting carbonylated compounds from a drink by liquid-solid extraction with a functionalized inert support containing nitrogenous nucleophilic functional groups. Advantageously, according to the present invention, the drink is wine or fruit juice. The process according to the present invention is advantageously applied to the reduction of the sulphur dioxide combination capacity of a drink such as wine.

21 Claims, No Drawings

EXTRACTING CARBONYL COMPOUNDS FROM A DRINK BY EXTRACTION WITH A FUNCTIONALIZED INERT SUPPORT

The present invention concerns a process for extracting carbonyl compounds from a beverage by liquid-solid extraction using an inert functionalized support containing nitrogenous nucleophilic functional groups, e.g. phenylsulfonylhydrazine or O-benzylhydroxylamine. Advantageously, according to the invention, the beverage is wine or fruit juice. The process of the present invention is advantageously applied to reducing the sulfur dioxide binding power of a beverage such as wine.

Sulfur dioxide is an additive universally used in oenology, having both anti-oxidant and antimicrobial action.

Sulfur dioxide is notably added during the must fermentation stage of making wines such as sweet white wines. This operation is intended to halt fermentation. When $SO_2$ is added to wine, equilibrium is set up between the different forms of this compound. One part reacts with the carbonyl compounds of the wine to give bisulfite combinations, it corresponds to bound $SO_2$. The other part corresponds to free $SO_2$. The carbonyl compounds or derivatives present in the wines, such as sweet white wines, derive in particular from the metabolism of fermenting yeasts.

To ensure the preservation of wines under good conditions, it is necessary to maintain a minimum content of free $SO_2$ in the wine to ensure its stability. It is also essential to remain within the legal limits of total $SO_2$ content which are regulated and for which hygienists recurrently demand—and generally obtain—a reduction, arguing the real toxicity of this compound.

The acid-base equilibrium constants of sulfurous acid are such that at the pH of wine, the most part of free $SO_2$ is present in the hydrogenosulfite form $HSO_3^-$. The active $SO_2$ form ($H_2SO_3$) is present at contents in the order of 1% of free $SO_2$, whereas the sulfite form $SO_3^{2-}$ is negligible.

For the production of wines having residual sugars, it is necessary, for good product stability, to have 1 mg/L active $SO_2$, which corresponds to a few ten mg/L of free $SO_2$ and a few hundred mg/L of total $SO_2$, since a substantial quantity of sulfur dioxide binds with the carbonyl derivatives and becomes inactive towards yeasts. In least favorable cases, the maximum authorized dose of 400 mg/L sulfur dioxide (CE Regulation 1493/99) does not, alone, allow every undesirable fermenting phenomenon to be avoided, translating as major spoilage of the wine. In some countries, the authorized minimum quantities of total sulfur dioxide are even lower (350 mg/L in Japan, 300 mg/L in Singapore), and greatly hinder the marketing of these wines.

Various processes, such as mechanical or physicochemical processes have already been developed to reduce the quantity of total sulfur dioxide added to wine. For example, processes using tangential microfiltration or anionic or cationic ion exchange resins have been developed. Most of the techniques used up until now to remove sulfites have often proved to be ineffective however, or have led to deterioration of the wine.

The need therefore exists to develop a new process with which to reduce the binding power of wines or other beverages such as fruit juice, and hence to reduce the quantity of necessary total $SO_2$ whilst maintaining a sufficient level of free $SO_2$.

The present invention sets out to fulfill this need. The Applicant has discovered an extraction method allowing a reduction in the quantities of carbonyl derivatives binding with sulfur dioxide (in particular: ethanal, pyruvic acid, 2-oxoglutaric acid and 5-oxofructose), without modifying the organoleptic qualities of the treated beverages such as wine. The process of the present invention therefore permits selective extraction of those compounds binding with $SO_2$, based on the formation of covalent bonds.

The extraction of carbonyl derivatives present in beverages such as wines or fruit juices, which are likely to bind with sulfur dioxide, is conducted according to the present invention by liquid-solid extraction using a functionalized solid support on which functional, extractor nucleophilic groups are grafted, said support being insoluble in said beverages to be purified.

The solution (beverage) is placed in the presence of the extractor functions, grafted on the insoluble support, advantageously of millimeter size, so that said functions react specifically with the constituents to be extracted.

After a certain contact time, the support carrying the grafted extractor functions and the constituents to be extracted chemically bound to the extractor functions, is removed from the medium by mere filtration/settling. The solution (beverage) is thereby purified of the constituents to be extracted, without any deterioration of its initial properties and without the addition of an additional constituent other than those initially present.

The removal of part of the carbonyl derivatives therefore leads to a significant reduction in the binding power of wines, and hence in the necessary quantity of total $SO_2$, whilst maintaining a sufficient content of free $SO_2$. It thereby facilitates wine stabilization. This reduction in the quantity of total $SO_2$ permits compliance with current regulatory standards, and also enables anticipation of new regulations (anticipated reductions in authorized maximum contents of total $SO_2$) while overcoming the hindrances regarding the above-mentioned markets.

Also, the process of the present invention pays heed to certain constraints related to the type of beverages to be treated, and in particular pays heed to operating conditions which protect the quality of wines:

extraction at ambient temperature, no addition of catalyst or other soluble species that are not removed at the end of the process, no release of products into the medium, other than those initially present in the wine.

The Applicant has also unexpectedly discovered that the liquid-solid extraction of carbonyl derivatives, which are largely responsible for bisulfite bonds, can be conducted at any stage of the winemaking process, in particular after completion of vinification, which simplifies its application. The extraction process according to the present invention can therefore by carried out before or after sulfiting.

In addition, the process of the present invention allows the quantities of 5-oxofructose in wine to be reduced. Yet the 5-oxofructose contents of botrytized grapes cannot generally be controlled; at the time of harvesting, even the strictest sorting often proves to be insufficient. Up until the present time, no treatment has managed to reduce the content of this compound which, in addition, is not affected by alcohol fermentation. Up until now therefore, there has been no method which can limit the binding of sulfur dioxide with 5-oxofructose in wines or other beverages such as fruit juices.

The subject-matter of the present invention is therefore an extraction process to extract carbonyl compounds from a beverage by liquid-solid extraction using a functionalized inert support containing functional, nitrogenous, nucleophilic, extractor groups.

Advantageously, according to the present invention, the beverage is wine or fruit juice. In the same way as for wines, fruit juices are also typically preserved through the addition of sulfur dioxide, and contain carbonyl derivatives which unnecessarily trap $SO_2$. With the process of the present invention it is possible to extract these carbonyl derivatives efficiently, without deteriorating the fruit juice and without modifying its organoleptic qualities.

Typically, the carbonyl compounds to be extracted according to the invention are compounds present in wines or fruit juices, in particular ethanal, pyruvic acid, 2-oxoglutaric acid, 5-oxofructose and their mixtures.

The extraction of carbonyl compounds is performed by placing the functionalized support in the beverage such as wine. The reaction medium (beverage) can be agitated or left undisturbed. The results of these two types of extraction (with or without agitation) are very close, extraction without agitation being slightly slower. Extraction is advantageously conducted at ambient temperature. After reaction, the support is removed from the medium by mere filtering or decanting.

The chemical reaction used to purify the beverages and to extract the carbonyl compounds is a nucleophilic attack on said carbonyl compounds, the attacked functions being of aldehyde or ketone type. In particular, it is an addition reaction or an addition reaction followed by water removal. The extractor functions are nitrogenous, nucleophilic compounds. These extractor functions are therefore able to react specifically with the carbonyl derivatives present in beverages such as wine, under the specific operating conditions specified above for this type of beverage. Part of the sulfur dioxide is also extracted from the beverage with the extractor function, probably via an acid-base reaction.

According to one particular aspect of the present invention, the functional nitrogenous, nucleophilic, extractor groups grafted on the support are chosen from the group consisting of hydroxylamines of $RONH_2$ type in which R is an alkyl or aryl group, in particular a $C_1$ to $C_{15}$ alkyl group; derivatives of hydrazines, advantageously hydrazines of formula $RNHNH_2$ in which R is an alkyl or aryl group, in particular a $C_1$ to $C_{15}$ alkyl group, sulfonylhydrazines of formula $RSO_2NHNH_2$ in which R is an alkyl or aryl group, in particular a $C_1$ to $C_{15}$ alkyl group, semicarbazides, and 2,4-dinitrophenylhydrazine; and diamines in which the nitrogen atoms are separated by an ethylene group and are substituted by identical or different groups.

In one particular embodiment of the present invention, the functional nitrogenous, nucleophilic groups grafted on the support are hydroxylamines of formula $RONH_2$ in which R is a benzyl group or a $C_1$ to $C_{15}$ alkyl group. If R is an alkyl group, it may contain more than 15 carbon atoms, becoming comparable for example with a polymer chain, if the functional group lies at the end of the chain on the support. Also, if R is an alkyl group, it may in some cases contain a heteroatom of oxygen or nitrogen type, incorporated in the middle of the alkyl chain.

In another particular embodiment of the present invention, the functional nitrogenous, nucleophilic groups grafted on the support are sulfonylhydrazines of formula $RSO_2NHNH_2$ in which R is a phenyl group or a $C_1$ to $C_{15}$ alkyl group. If R is an alkyl group, it may contain more than 15 carbon atoms, becoming comparable to a polymer chain for example, if the functional group lies at the end of the chain on the support. Also, if R is an alkyl group, it may in some cases contain a heteroatom, of oxygen or nitrogen type, incorporated in the middle of the alkyl chain.

In particularly advantageous manner according to the invention, the functional nitrogenous, nucleophilic extractor groups are chosen from among phenylsulfonylhydrazine and O-benzylhydroxylamine.

In one particular example of embodiment of the present invention, the support is functionalized with the phenylsulfonylhydrazine function, and the phenyl radical of phenylsulfonylhydrazine is optionally substituted, advantageously at ortho, meta and/or para, by substituents such as Me, $NO_2$, OH, Pr, i-Bu, $NH_2$, COR and/or a halogen.

In another particular embodiment of the invention, the functional nitrogenous, nucleophilic groups grafted on the support are diamines in which the nitrogen atoms are separated by an ethylene group and are substituted by identical or different groups of H, OH, Me type or a carbon group. For example, the diamines may be polyethyleneimines, an amino-epoxy resin formed from epichlorohydrine and ethylenediamine, or N,N'-dimethyl-1,2-ethanediamine.

The principle of extraction according to the invention is the shift of equilibriums. The equilibriums under consideration are grouped together in following Scheme 1. In this Scheme 1, S represents the support, and the functional group used to extract the carbonyl derivatives, which is grafted on the support, is phenylsulfonylhydrazine.

Scheme 1: Shift of equilibriums

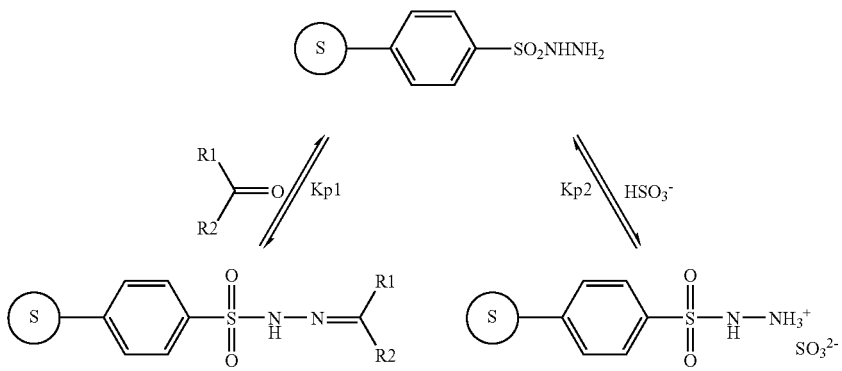

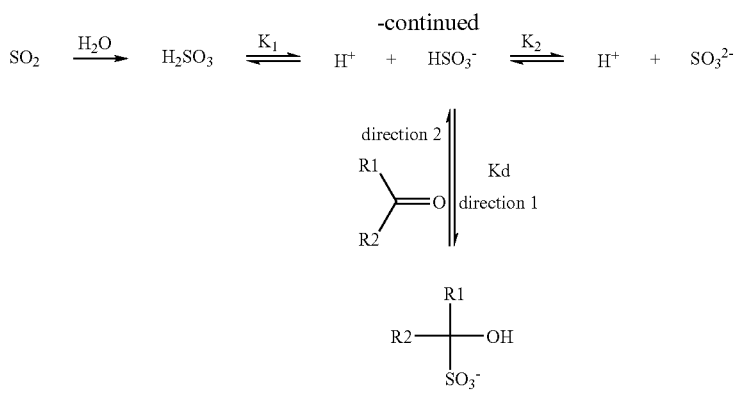

$$SO_2 \xrightarrow{H_2O} H_2SO_3 \xrightleftharpoons{K_1} H^+ + HSO_3^- \xrightleftharpoons{K_2} H^+ + SO_3^{2-}$$

When sulfur dioxide is added to a water-alcohol solution such as wine, it immediately reacts with a water molecule to form $H_2SO_3$. This weak acid can separate to give $HSO_3^-$ and $SO_3^{2-}$. At the pH of wines (pH in the order of 3.5) and of fruit juice, it is the $HSO_3^-$ form which predominates. In the presence of carbonyl derivatives, it reacts to form a bisulfite bond (direction 1). All the bisulfite bonds correspond to bound sulfur dioxide. The dissociation constants of each bisulfite bond translate the affinity for $SO_2$ of the corresponding carbonyl compounds. In wine or fruit juice, carbonyl compounds coexist present in the form of bisulfite combinations and in free form. Sulfur dioxide exists in the form of bound bisulfite and in the form of hydrogenosulfite ions, even in molecular form (very small percentage).

During treatment (extraction) the free carbonyl derivatives react with the phenylsulfonylhydrazine grafted on the support. To restore the ratio between free compounds and bound compounds, the bisulfite combinations are disrupted (direction 2) and release $HSO_3^-$ and the carbonyl derivatives. Therefore the carbonyl derivatives are progressively trapped by the support. The $HSO_3^-$ released into the medium is therefore trapped by the support, and hence partly removed from the medium to a greater or lesser extent.

According to one particular characteristic of the present invention, the support is a support that is insoluble in the beverage, is an organic or inorganic support, and is advantageously of millimeter size. Typically, the size of the support lies between 0.03 and 1.2 mm. The support used must be chemically inert towards the reaction medium (beverage) in which it is immersed. It must also be capable of being grafted with the chosen extractor function.

The support can be of organic, porous type and formed of a 3-dimensional network (making it insoluble). It may be of gel type, macroporous, microporous or hyper-crosslinked typically obtained by direct crosslinking or post-crosslinking.

The support may also be of inorganic, three-dimensional type (hydrogel, silica aerogel or xerogel, a mesoporous or microporous support, leading to a class I or class II hybrid support).

Advantageously, according to the present invention, the support is polymer-, silica-, alumina- or clay-based. Further advantageously according to the present invention, the support is a polymer support containing vinyl and/or styrene monomers. Preferably a copolymer is used containing vinyl and styrene monomers.

The support is therefore advantageously produced from mixtures of vinyl type monomers [divinylbenzene, trivinylbenzene, 1,8-bis(ethenylphenyl)-2,7-dioxooctane] and the entire family constructed from polytetrahydrofurans [poly (ethylene glycol)divinylether, ethylene glycol dimethacrylate, butanediol dimethacrylate, biphenol A dimethacrylate, hexanediol dimethacrylate], and of styrene type [styrene, methylstyrene, chloromethylstyrene, p-sulfonyl-styrene chloride, O-(p-vinyl-benzyl)acetoxime, O-(p-vinyl-benzyl) oxy)amine, p-sulfonic styrene acid, p-vinylphenol, p-vinylbenzoic acid, p-vinylbenzaldehyde], in variable proportions depending on the properties of the material it is desired to obtain.

In one particular embodiment, the support contains a styrene-divinylbenzene copolymer.

According to one particular characteristic of the present invention, the functionalization rate of the support lies between 0.75 and 4.5 mmol/g, advantageously between 2.5 and 4 mmol/g.

In one particular embodiment of the present invention, the quantity of support ranges from 1 to 15 g per liter of beverage, advantageously between 1 and 5 g per liter of beverage.

In one particular embodiment of the present invention, the support used is a polymer support. With a polymer support two functionalization routes are possible. The first route is described in Scheme 2 below. In this Scheme 2, PS represents the polymer support, and the functional extractor group which is grafted on said support is phenylsulfonylhydrazine.

Scheme 2: Functionalization of the polymer support via the chlorosulfonic acid route

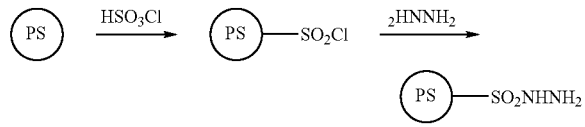

In one particular embodiment of the present invention, a support of polystyrene type crosslinked with divinylbenzene can be functionalized in two steps by using firstly chlorosulfonic acid (3 mL per gram of support) then by conducting hydrazination (4 equivalents).

A second, gentler, functionalization route is possible for supports pre-functionalized with the sulfonic acid function. The support in this case is treated with thionyl chloride (2 to 5 equivalents), and is then subjected to hydrazination (4 equivalents). It is this second route which is preferably used under the present invention to functionalize the polymer supports used for extractions.

In another particular embodiment of the present invention, the support used is a silica support. With a silica support, this support can be functionalized as described in following Scheme 3. In this Scheme 3, the functional extractor group which is grafted on said support is phenylsulfonylhydrazine.

Scheme 3: Functionalization of the silica support

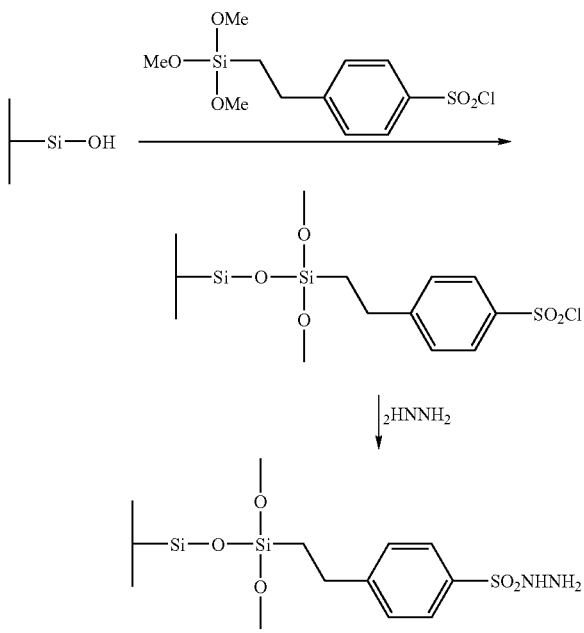

A further subject-matter of the present invention is a process to reduce the sulfur dioxide binding power of a beverage, comprising the following successive steps:
- extracting carbonyl compounds from said beverage according to the extraction process mentioned above, and
- removing the support by filtering or decanting.

After extracting the carbonyl compounds from the beverage by the functionalized support, the support is therefore removed from the medium by mere filtration or decanting.

The extraction of the carbonyl compounds is typically performed at ambient temperature, advantageously without agitation so as not to disturb beverages such as wine.

According to one particular characteristic of the present invention, extraction is conducted for a time of between 1 day and 52 weeks, advantageously between 1 and 8 weeks.

Advantageously, the process according to the present invention is implemented before or after sulfiting. In particularly advantageous manner, the process of the present invention can be performed after $SO_2$ addition, e.g. at the end of the vinification process.

The following examples are non-limiting and are given to illustrate the present invention.

EXAMPLE 1

Of an Embodiment of the Invention

Phenylsulfonylhydrazine was used as extractor function of the carbonyl derivatives from wine.

The efficacy of this extractor function was tested on model solutions: first in a homogeneous medium before and after addition of sulfur dioxide to the solution.

Next, after grafting the extractor functions on supports, the tests were performed in a heterogeneous medium, before and after sulfur dioxide addition to the solution. Supports of polymer (styrene-divinylbenzene copolymer) and silica type were used for this test.

Extraction of carbonyl compounds of ethanal, pyruvic acid, 2-oxoglutaric acid and 5-oxofructose type by the phenylsulfonylhydrazine extractor function gave particularly high performance, both in a homogeneous medium and in a heterogeneous medium, before or after addition of sulfur dioxide to the reaction medium.

Extractions were then performed by immersing the functionalized support in wine. The mixture can be agitated or left undisturbed. The results of the two types of extraction were very close, the extractions without agitation being slightly slower. Extractions were conducted at ambient temperature. After the reaction, the support was removed from the medium by filtering.

The support functionalization rates were determined using conventional, suitable analysis methods. The quantities of carbonyl derivatives present in the wine and sulfur dioxide contents were measured using conventional assay methods.

Results of Extractions

Extractions were conducted on Sauternes 1999 and 2000 wines having a free $SO_2$ content that was precisely known and in the order of 50 mg/L, for a total $SO_2$ content in the order of 400 mg/L. Extractions were performed using fractions of around 100 ml wine which received an addition of several quantities of functionalized supports (2, 6 and 10 equivalents of function relative to the carbonyl derivatives present). The bottles were agitated using a rotary agitator with end-over-end rotation, 9 rpm, or left without agitation. A reference bottle was used to compare with the natural development of the wine during extraction.

Results showed that agitation had no influence on the quality of extraction. The measurements were taken every week for four weeks. They show that extractions showed little change in relation to time. The quantity of support functions present in the medium has an influence on the extent of extraction. Contacting of the wine with the functionalized supports for four weeks translates as a reduction in the contents of carbonyl compounds: ethanal decreases from 145 to 60 mg/L, pyruvic acid from 125 to 23 mg/L, 2-oxoglutaric acid from 90 to 5 mg/L and 5-oxofructose from 126 to 52 mg/L. At the same time, logically, the binding power of the wine is distinctly decreased since the contents of free $SO_2$ are increased (from 25 to 56 mg/L) and the contents of bound $SO_2$ are reduced (from 296 to 192 mg/L).

Analysis of Contaminants

The use of sensitive analytical methods (GC/MS) was unable to evidence the occurrence of new compounds in the medium after extraction and filtration of the supports.

EXAMPLE 2

Of an Embodiment of the Invention

Use of a Polymer Support

Extractions were performed using a polymer support functionalized at 2.6 mmol/g with phenylsulfonylhydrazine. This support was obtained by treating a DOWEX® 50WX2-100 resin with 3 equivalents thionyl chloride, followed by hydrazination. A 80 ml fraction of 2000 Sauternes wine was treated with 0.354 g of support. Extraction was carried out over a period of four weeks without agitation. After filtering, measurements were taken by enzymatic assay (for the carbonyl derivatives) and using Ripper's method (for sulfur dioxide). The reference bottle was subjected to the same temperature conditions. The results obtained are given in following Table 1:

TABLE 1

Results of extractions after four weeks without agitation, using a polymer support.

| Analyzed compound | Compound concentration in the reference (mg/L) | Compound concentration in the sample after treatment (mg/L) |
|---|---|---|
| Ethanal | 149 | 60 |
| Pyruvic acid | 125 | 23 |
| 2-oxoglutaric acid | 93 | 0 |
| 5-oxofructose | 126 | 52 |
| Free $SO_2$ | 24 | 56 |
| Bound $SO_2$ | 296 | 192 |

The results show that each carbonyl derivative is extracted from the wine at a rate of at least 60%. This leads to a decrease in the binding power of the wine. The results show that bound $SO_2$ is decreased by 100 mg/L, and at the same time free $SO_2$ is increased by 32 mg/l.

Use of a Silica Support

Extractions were performed using a silica support functionalized at 0.8 mmol/g with phenylsulfonylhydrazine. Extraction was performed on a 100 ml fraction of 1999 Sauternes wine using 3.3 g of support. Measurements were taken four weeks after contacting. After filtering, measurements were performed by enzymatic assay (for the carbonyl derivatives) and using Ripper's method (for sulfur dioxide). The reference bottle was subjected to the same temperature conditions. The results obtained are given in following Table 2:

TABLE 2

Results of extractions after four weeks without agitation, using a silica support.

| Analyzed compound | Compound concentration in the reference (mg/L) | Compound concentration in the sample after treatment (mg/L) |
|---|---|---|
| Ethanal | 118 | 67 |
| Pyruvic acid | 90 | 16 |
| 2-oxoglutaric acid | 38 | 0 |
| 5-oxofructose | 108 | 15 |
| Free SO2 | 20 | 26 |
| Bound SO2 | 294 | 140 |

The results show that the carbonyl derivatives are extracted from the wine at a rate of more than 50%. The binding power of the wine was also reduced in this example. Bound $SO_2$ was reduced by 150 mg/L, and free $SO_2$ was increased (from 20 to 26 mg/L).

The invention claimed is:

1. A process for extracting carbonyl compounds from a beverage by liquid-solid extraction using an inert functionalized solid support comprising one or more functional nitrogenous nucleophilic groups, wherein the functional nitrogenous, nucleophilic groups are derivatives of compounds chosen from the group consisting of hydrazines.

2. The process according to claim 1, wherein the beverage is wine or fruit juice.

3. The process according to claim 2, wherein the carbonyl compounds are compounds present in wine or fruit juice, and mixtures thereof.

4. The process according to claim 1, wherein the functional nitrogenous, nucleophilic groups are derivatives of phenylsulfonylhydrazine.

5. The process according to claim 1, wherein the support is insoluble in the beverage.

6. The process according to claim 5, wherein the support is polymer-based, silica-based, alumina-based, or clay-based.

7. The process according to claim 6, wherein the support is polymer-based, wherein the polymer comprises vinyl monomers, styrene monomers, or mixtures thereof.

8. The process according to claim 1, wherein the support exhibits a functionalization rate of between 0.75 mmol/g and 4.5 mmol/g.

9. The process according to claim 1, wherein the quantity of support ranges from 1 g per liter of beverage to 15 g per liter of beverage.

10. A process to reduce the sulfur dioxide binding power of a beverage, comprising the following successive steps:
    extraction of carbonyl compounds from said beverage by liquid-solid extraction using an inert functionalized solid support comprising one or more functional nitrogenous nucleophilic groups, and
    removal of the support by filtration or decanting.

11. The process according to claim 10, wherein extraction of the carbonyl compounds is performed at ambient temperature.

12. The process according to claim 10, wherein extraction of the carbonyl compounds is conducted for a time of between 1 day and 52 weeks.

13. The process according to claim 10, wherein the process is implemented before or after sulfiting.

14. The process according to claim 3, wherein the carbonyl compounds are chosen from the group consisting of ethanal, pyruvic acid, 2-oxoglutaric acid, 5-oxofructose, and mixtures thereof.

15. The process according to claim 1, wherein the functional nitrogenous, nucleophilic groups are derivatives of hydrazines chosen from the group consisting of:
    hydrazines of formula $R^1NHNH_2$ in which $R^1$ is an alkyl or aryl group;
    sulfonylhydrazines of formula $R^2SO_2NHNH_2$ in which $R^2$ is an alkyl or aryl group; and
    semicarbazides of formula $R^3NHCONHNH_2$ in which $R^3$ is an alkyl or aryl group.

16. The process according to claim 15, wherein the functional nitrogenous, nucleophilic groups are derivatives of 2,4-dinitrophenylhydrazine.

17. The process according to claim 7, wherein the polymer comprises a styrene-divinylbenzene copolymer.

18. The process according to claim 11, wherein the extraction of carbonyl compounds is performed without agitation.

19. The process according to claim 5, wherein the support is organic.

20. The process according to claim 3, wherein the support is inorganic.

21. The process according to claim 5, wherein the support is about one millimeter in size.

* * * * *

UNITED STATES PATENT AND TRADEMARK OFFICE
CERTIFICATE OF CORRECTION

| | | |
|---|---|---|
| PATENT NO. | : 8,313,790 B2 | Page 1 of 1 |
| APPLICATION NO. | : 12/293802 | |
| DATED | : November 20, 2012 | |
| INVENTOR(S) | : Hervé Deleuze et al. | |

It is certified that error appears in the above-identified patent and that said Letters Patent is hereby corrected as shown below:

IN THE CLAIMS

Column 10, claim 20, line 57, please delete "20. The process according to claim 3," and insert -- 20. The process according to claim 5, --.

Signed and Sealed this
Seventeenth Day of September, 2013

Teresa Stanek Rea
*Deputy Director of the United States Patent and Trademark Office*